US008107326B1

(12) United States Patent
Hirano et al.

(10) Patent No.: US 8,107,326 B1
(45) Date of Patent: Jan. 31, 2012

(54) SLIDER WITH INTEGRATED THERMALLY-ASSISTED RECORDING (TAR) HEAD AND INTEGRATED LONG LASER DIODE

(75) Inventors: Toshiki Hirano, San Jose, CA (US); Barry Cushing Stipe, San Jose, CA (US); Timothy Carl Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/946,420

(22) Filed: Nov. 15, 2010

(51) Int. Cl.
*G11B 11/00* (2006.01)
(52) U.S. Cl. .................. 369/13.33; 369/112.27
(58) Field of Classification Search ........ 369/13.33, 369/13.32, 13.24, 13.14, 13.03, 13.02, 13.12, 369/112.27, 112.09, 112.14, 112.21, 13.17; 360/59, 313, 245.3, 126, 123.17, 125.31, 360/128
See application file for complete search history.

(56) References Cited

U.S. PATENT DOCUMENTS

| | | | |
|---|---|---|---|
| 6,404,706 | B1 | 6/2002 | Stovall et al. |
| 6,549,506 | B1 | 4/2003 | Johnson |
| 6,614,827 | B1 | 9/2003 | Mooradian |
| 6,771,589 | B2 | 8/2004 | Ueyanagi et al. |
| 6,778,582 | B1 | 8/2004 | Mooradian |
| 7,133,230 | B2 | 11/2006 | Saga et al. |
| 7,643,248 | B2 | 1/2010 | Sluzewski |
| 7,986,592 | B2 * | 7/2011 | Hirano et al. ............. 369/13.24 |
| 2003/0007442 | A1 | 1/2003 | Henrichs |
| 2005/0226304 | A1 | 10/2005 | Schwarz et al. |
| 2006/0187564 | A1 | 8/2006 | Sato et al. |
| 2008/0002298 | A1 | 1/2008 | Sluzewski |
| 2008/0316872 | A1 | 12/2008 | Shimizu et al. |

(Continued)

FOREIGN PATENT DOCUMENTS

| | | |
|---|---|---|
| JP | 2009277285 | 11/2009 |
| JP | 2009301597 | 12/2009 |
| JP | 2010027185 | 2/2010 |

OTHER PUBLICATIONS

Van Laere, et al., "Compact Focusing Grating Couplers for Silicon-on-Insulator Integrated Circuits", IEEE Photonics Technology Letters, vol. 19, No. 23, Dec. 1, 2007, pp. 1919-1921.

(Continued)

*Primary Examiner* — Ali Neyzari
(74) *Attorney, Agent, or Firm* — Thomas R. Berthold

(57) ABSTRACT

A thermally-assisted recording (TAR) slider has an integrated TAR head and an integrated laser diode. The laser diode may be an external-cavity VCSEL that includes a semiconductor substrate with the VCSEL formed on one surface, an external cavity on the opposite surface, and an output third mirror on the output surface of the external cavity. The TAR head is integrated with the slider at the trailing end and includes an optical waveguide having a grating coupler oriented in a plane generally parallel to the slider trailing end, and a near-field transducer (NFT) at the slider air-bearing surface (ABS) and coupled to the waveguide. A carrier is attached to the slider and has a base portion that supports the external-cavity VCSEL so that the linear path of its output laser beam is aligned with and oriented orthogonal to the plane of the grating coupler. The grating coupler receives the laser radiation and turns it 90 degrees into the waveguide, which directs the laser radiation to the NFT at the ABS.

20 Claims, 6 Drawing Sheets

U.S. PATENT DOCUMENTS

| | | |
|---|---|---|
| 2009/0196128 A1 | 8/2009 | Lille |
| 2009/0310459 A1 | 12/2009 | Gage et al. |
| 2010/0002332 A1 | 1/2010 | Dugas et al. |
| 2010/0007980 A1 | 1/2010 | Kim et al. |

OTHER PUBLICATIONS

Hadley, et al., "High single-transverse-mode output from external-cavity surface-emitting laser diodes", Appl. Phys. Lett. 63 (12), Sep. 20, 1993, pp. 1607-1609.

Van Laere et al., "Compact Focusing Grating Couplers Between Optical Fibers and Silicon-on-Insulator Photonic Wire Waveguides", Optical Fiber Communication and the National Fiber Optic Engineers Conference on Mar. 25-29, 2007.

J. G. McInerney, et al., "High brightness 980 nm pump lasers based on the Novalux Extended Cavity Surface-Emitting Laser (NECSEL) concept", Proc. of SPIE vol. 4947 (2003), pp. 240 251.

"Thermally Assisted Recording Head with heat source on side of slider and method for producing the same", published on web at http://ip.com/IPCOM/000157835, Sep. 5, 2007.

\* cited by examiner

SLIDER WITH INTEGRATED THERMALLY-ASSISTED RECORDING (TAR) HEAD AND INTEGRATED LONG LASER DIODE

TECHNICAL FIELD

This invention relates generally to a thermally-assisted recording (TAR) disk drive, in which data are written while the magnetic recording layer on the disk is at an elevated temperature, and more specifically to a TAR slider with an integrated TAR head and integrated long laser diode, like an external-cavity vertical-cavity surface-emitting laser (VCSEL).

BACKGROUND OF THE INVENTION

Thermally-assisted recording (TAR), also called heat-assisted magnetic recording (HAMR), has been proposed. In a TAR disk drive, an optical waveguide with a near-field transducer (NFT) directs radiation from a laser to heat localized regions of the magnetic recording layer on the disk. The radiation heats the magnetic material locally to near or above its Curie temperature to lower the coercivity enough for writing to occur by the magnetic field from the write head. The recorded data is read back by a conventional magnetoresistive read head. The TAR head, which includes the optical waveguide, write head and read head, is formed on the trailing surface of a head carrier, such as a slider with an air-bearing surface (ABS) that allows the slider to ride on a thin film of air above the surface of the rotating disk. The top side of the slider (the side opposite the ABS) is attached to a flexure/suspension assembly so that the slider can be moved across the disk surface by the disk drive actuator.

It is desirable to integrate the laser, which is typically a laser diode, with the slider so that the laser light is directed to the optical waveguide on the slider. This does not present a significant problem for laser diodes, like a vertical-cavity surface-emitting laser (VCSEL), which typically have a relatively short length of about 100 μm, as compared to the slider length of about 850 μm. TAR sliders with various means for attachment of relatively short laser diodes have been proposed. For example, in US 20080002298 A1, the laser diode is formed on a substrate surface that faces the trailing end of the slider, and the substrate is attached by bonding pads that connect the same substrate surface directly to the trailing end of the slider. However, a typical VCSEL has power output of about 10 mW, which is not adequate for currently proposed TAR disk drives, which need a power output of about 50 mW.

Thus more powerful laser diodes, which will typically be longer than VCSELs, are required for TAR. One type of more powerful and longer laser diode is an external-cavity VCSEL, where a third mirror is on the back side of the VCSEL semiconductor substrate. The external cavity and third mirror allow for higher single mode power than can be achieved with a conventional VCSEL. An external-cavity VCSEL is described in U.S. Pat. No. 6,778,582 B1 and by J. G. McInerney, et al., "High brightness 980 nm pump lasers based on the Novalux Extended Cavity Surface-Emitting Laser (NECSEL) concept", Proc. of SPIE Vol. 4947 (2003), pp. 240-251. However, because an external-cavity VCSEL has a length of at least at 300 μm and the length of current disk drive sliders is only around 850 μm, there are problems in integrating the laser with the slider with the necessary mechanical support, electrical connections and heat sink requirements. The integration is made more challenging because the thickness of the slider (the slider "height" between the ABS and the top side) and its connection to the flexure/suspension assembly cannot be increased without increasing the disk-to-disk spacing in the disk drive, which would undesirably increase the overall size of the disk drive.

What is needed is a TAR slider with an integrated laser diode longer than 300 μm, like an external-cavity VCSEL, that does not require an increase in the slider thickness.

SUMMARY OF THE INVENTION

The invention relates to a TAR slider with integrated TAR head and an integrated relatively long (greater than 300 μm) laser diode. The laser diode may be an external-cavity VCSEL. The external-cavity VCSEL includes a semiconductor substrate with the VCSEL formed on one surface, an external cavity on the opposite surface, and an output third mirror on the output surface of the external cavity. The external-cavity may be the semiconductor substrate or the semiconductor substrate together with a block of material that is transparent to the laser radiation and is attached to the semiconductor substrate. The TAR head is integrated with the slider at the trailing end and includes an optical waveguide having a grating coupler oriented in a plane generally parallel to the slider trailing end, and a near-field transducer (NFT) at the slider ABS and coupled to the waveguide. A carrier is attached to the slider and supports the external-cavity VCSEL so that the linear path of its output laser beam is aligned with and oriented orthogonal to the plane of the grating coupler. The grating coupler receives the laser radiation and turns it 90 degrees into the waveguide, which directs the laser radiation to the NFT at the ABS. In one embodiment, the carrier has a generally U-shape with a base and legs. The external-cavity VCSEL is attached to the base between the legs, with the legs being on opposite sides of and generally parallel to the linear path of its output laser beam and the ends of the legs being attached to the slider trailing end. In a second embodiment, the carrier has a base that supports the external-cavity VCSEL and a single leg that is attached to a side of the slider. The height of the carrier and attached external-cavity VCSEL is less than the height of the slider, i.e., the spacing distance between the slider ABS and the slider top surface opposite the ABS.

For a fuller understanding of the nature and advantages of the present invention, reference should be made to the following detailed description taken together with the accompanying figures.

DETAILED DESCRIPTION OF THE INVENTION

Figure 1:
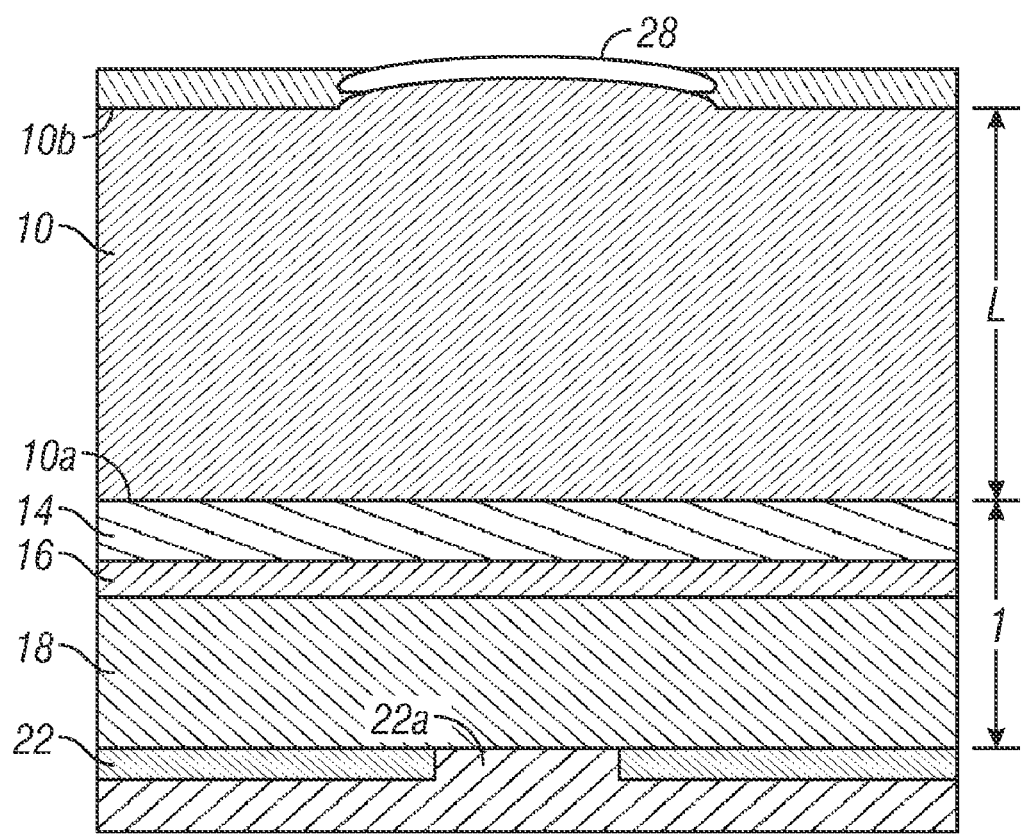
FIG. 1 is sectional view of a prior art external-cavity vertical cavity surface emitting laser (VCSEL).

FIG. 1 is a sectional view of a monolithic external-cavity VCSEL according to the prior art and as described in U.S. Pat. No. 6,778,582 B1 and in the previously-cited article by J. G. McInerney, et al. The external-cavity VCSEL has a semiconductor substrate 10 with front surface 10a, back surface 10b and thickness L. A VCSEL with active region 1 is formed on front surface 10a and includes gain layer 16 located between partially reflecting intermediate Bragg reflector or mirror 14 and bottom Bragg mirror 18, and an oxide layer 22 that defines an aperture 22a. A partially reflecting output mirror 28 is formed on the back surface 10b of semiconductor substrate 10 and functions as a third mirror. The laser radiation is emitted through the third mirror 28. The semiconductor substrate 10 with thickness L functions as an external cavity for the VCSEL. The external cavity allows for higher single mode power than can be achieved with a typical VCSEL without the external cavity and third mirror. When the external cavity is made from GaAs, the external-cavity VCSEL may be designed to generate laser radiation with a wavelength of greater than approximately 920 nm. For example, the wavelength may be between 920 nm and 1000 nm. Shorter wavelengths require the use of a different substrate due to optical losses in the in GaAs. The external-cavity VCSEL shown in FIG. 1 is a single device that has been cut from a semiconductor wafer onto which the materials making up the various layers have been deposited and patterned using well-known semiconductor lithographic and fabrication processes. Thus a large number of devices are formed on a single wafer. The materials, dimensions and fabrication methods for the external-cavity VCSEL shown in FIG. 1 are described in detail in U.S. Pat. No. 6,778,582 B1.

Figure 2:
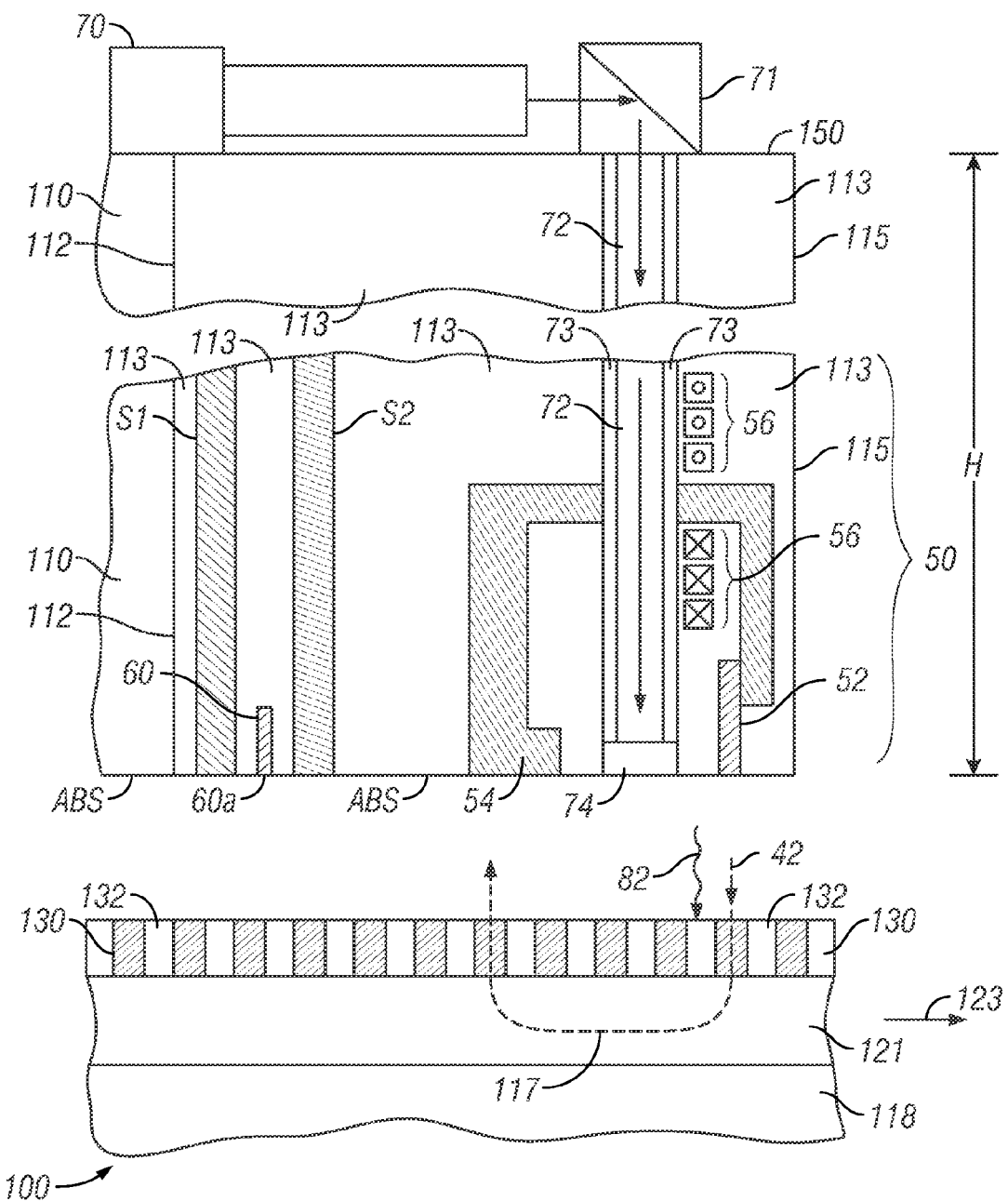
FIG. 2 is a sectional view through a portion of a disk and an air-bearing slider that supports a thermally-assisted recording (TAR) head according to the prior art.

FIG. 2 is a sectional view through a portion of a TAR disk 100 and air-bearing slider 110 that functions as the head carrier with integrated TAR head, as proposed in the prior art. FIG. 2 is not drawn to scale because of the difficulty in showing the very small features. The TAR disk 100 is depicted as a patterned-media disk with a disk substrate 118 and discrete magnetic islands 130 and nonmagnetic regions 132. The islands 130 are spaced apart by nonmagnetic regions 132, which may formed of polymeric material for planarizing disk 100. The islands 130 are magnetized perpendicularly, resulting in the recorded bits being stored in the recording layer of the islands 130 in a generally perpendicular or out-of-plane orientation. The islands 130 are discrete magnetic islands that function as the patterned bits. A heat sink layer 121 may be located below the islands 130 and nonmagnetic regions 132. The TAR disk 100 may also be a conventional continuous-media magnetic recording disk wherein the recording layer is not patterned but is a continuous layer.

Also shown on slider 110 with disk-facing surface or air-bearing surface (ABS) is the read head 60 and the write head 50 (with the yoke that connects write pole 52 and a return pole 54). The ABS of slider 110 is the surface that faces the disk 100 and is shown without the thin protective overcoat typically present in an actual slider. The ABS shall mean the surface of the head carrier that is covered with a thin protective overcoat, the actual outer surface of the head carrier if there is no overcoat, or the outer surface of the overcoat. Write current passes through a coil 56 of the write head 50 to generate a magnetic field (arrow 42) at the write pole 52. This magnetic field magnetizes the recording layer on the island 130 beneath the write pole 52 as the disk 100 moves past the write head 50 in the direction of arrow 123. The detection or reading of the recorded bits is by a read head 60 having a sensing edge 60a at the ABS. The read head is typically a magnetoresistive (MR) read head, such as a tunneling MR (TMR) read head in which a sense current passes perpendicularly through the layers making up the head. A pair of magnetic permeable shields S1 and S2 are located on opposite sides of read head 60 to prevent magnetic flux from bits other than the bit being read from reaching the read head 60. The write coil 56 is shown as a conventional flat or "pancake" coil wrapped around the yoke that connects the write pole 52 with the return pole 54, with the electrical current directions being shown as into the paper by the coil cross-sections marked with an "X" and out of the paper by the coil cross-sections marked with a solid circle. However, the coil may also be a conventional helical coil wrapped around the portion of the yoke that directly supports the write pole 52. The slider 110 with integrated TAR head has an outer surface or trailing end 115 with electrically conductive pads (not shown) that connect through the insulating layers 113 to the read head 60 and coil 56 of write head 50.

The slider 110 also supports a laser 70, mirror 71, optical channel or waveguide 72 and near-field transducer (NFT) 74, which has its output at the ABS. The laser 70 and mirror 71 are shown as being supported on the top surface 150 of slider 110. The spacing between the generally parallel ABS and top surface 150 defines the height H of the slider 110, which for conventional sliders is in the range of about 180 to 300 μm. The optical waveguide 72 is depicted in FIG. 2 as extending through the yoke of write head 50 and being located between the write pole 52 and return pole 54. However the optical waveguide 72 may be located at other locations, such as between shield S2 and return pole 54, or between the write pole 52 and the outer face of the slider 110. The waveguide 72 is formed of a core material such as $Ta_2O_5$ or another high index dielectric material that is transmissive to radiation at the wavelength of the laser and is surrounded by a dielectric cladding layer 73 (for example $SiO_2$ or $Al_2O_3$) of lower refractive index than the core material. While the slider 110 in FIG. 2 is depicted as supporting mirror 71 for directing the laser radiation from laser 70 into waveguide 72, it is known to use a grating coupler coupled to the waveguide, as described for example in US 20090310459 A1.

The NFT 74 is located at the output of waveguide 72 at the ABS of the slider 110. The laser radiation strikes the NFT 74, creating concentrated near-field radiation to the islands 130 as the disk rotates in the direction 123 past the slider 110. A "near-field" transducer, as used herein, refers to "near-field optics", wherein the passage of light is to, from, through, or near an element with subwavelength features and the light is coupled to a second element located a subwavelength distance from the first. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. Sometimes, the metal structure can create resonant charge motion, called surface plasmons or local plasmons, to further increase intensity. The electromagnetic field of the oscillating tip charge then gives rise to optical output in the near field, which is directed to the data islands on the disk. The NFT 74 has features less than the wavelength of the laser radiation and the spacing between the NFT 74 and the islands is less than the wavelength of the laser radiation.

When write-current is directed through coil 56, the write pole 52 directs magnetic flux to the data islands 130. The dashed line 117 with arrows shows the flux return path back to the return pole 54. The NFT 74 directs near-field radiation, as represented by wavy arrow 82, to the data islands 130 as the TAR disk 100 moves in the direction 123 relative to the slider 110. The electric charge oscillations in the NFT 74 heat the data islands 130. This raises the temperature of the magnetic recording material in a data island to near or above its Curie temperature to thereby lower the coercivity of the material and enable the magnetization of the data island to be switched by the write field from the write pole 52.

The TAR head elements, i.e., read head 60, shields S1, S2, return pole 54, write pole 52, coil 56 and waveguide 72, are fabricated on a trailing surface 112 of slider 110 using well-known conventional thin film deposition and patterning techniques. The TAR head is thus integrated with the slider 110, with resulting trailing end 115. Insulating material, typically alumina, is deposited at various times during the fabrication process to separate the various TAR head elements and refill recessed areas, as shown by insulating layers 113. The insulating material generally surrounds the TAR head elements and provides a portion of the ABS. The slider 110 is typically formed of an alumina/titanium-carbide ($Al_2O_3$/TiC) composite material. The trailing surface 112 is the surface of a wafer onto which a large number of TAR heads are patterned. The wafer is then diced into individual sliders with the length of the sliders (in the direction perpendicular to trailing surface 112) corresponding generally to the thickness of the wafer. US 20090258186 A1, assigned to the same assignee as this application, describes a wafer-level process for fabricating TAR heads with thin film waveguides and NFTs.

The invention is a slider with integrated TAR head and an integrated relatively long (greater than 300 μm) laser diode. Preferably the laser diode is an external-cavity VCSEL. An embodiment of the invention is shown in the top view of FIG. 3. The slider 210 with integrated TAR head has a top surface 250, a front end 225, a trailing end 215, and generally parallel sides 260, 265. The slider has a typical length between front end 225 and trailing end 215 of about 850 to 1250 μm. The TAR head is depicted as being integrated with the slider 210 and formed between trailing surface 212 and trailing end 215. The TAR head includes a grating coupler 77, which is located in a plane generally parallel to trailing end 215 and is thus depicted in edge view. The external-cavity VCSEL 300 is attached to carrier 400 which is attached to the slider trailing end 215.

Figure 3:
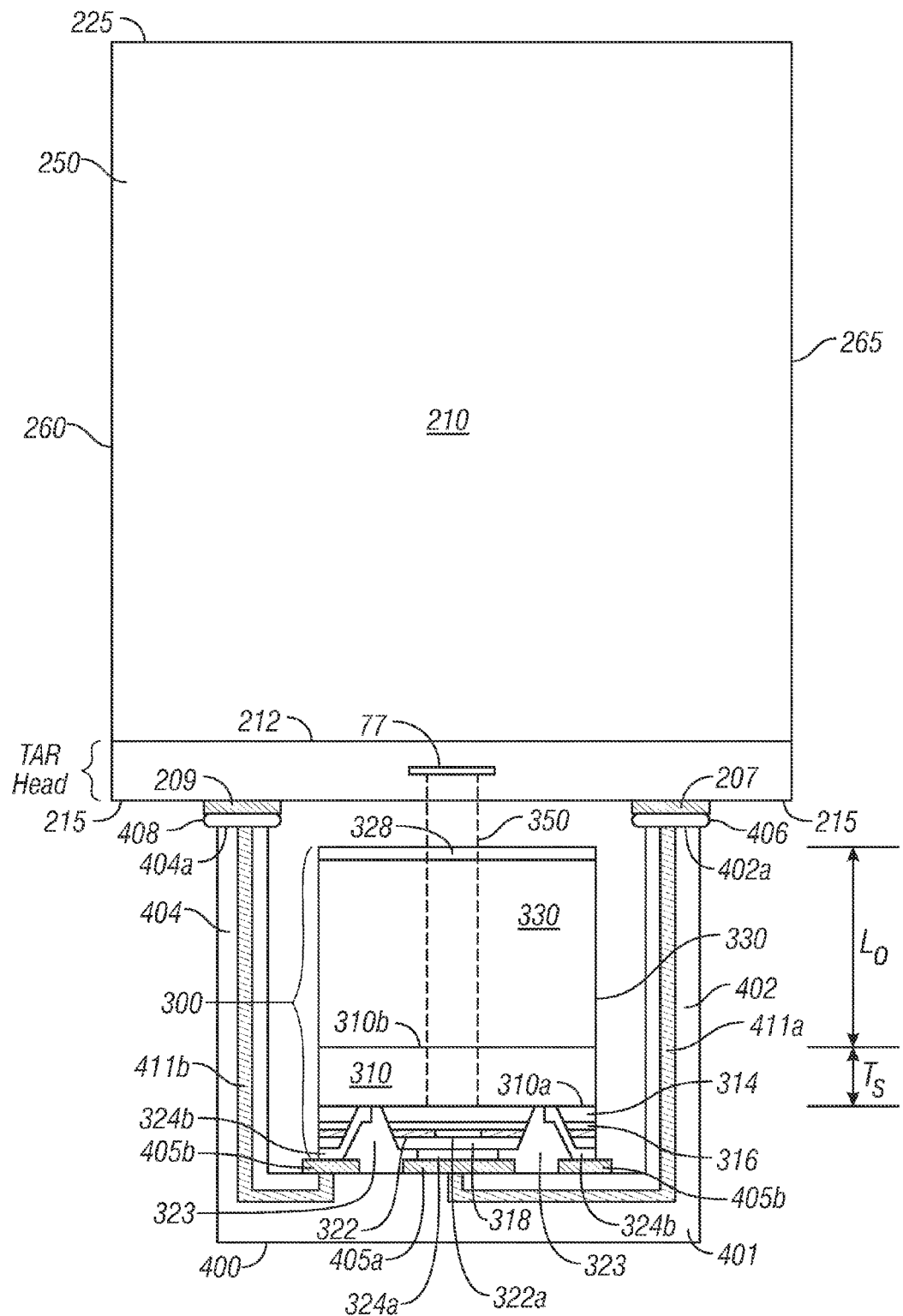
FIG. 3 is a top view of a slider with integrated TAR head and integrated external-cavity VCSEL according to one embodiment of the invention wherein the carrier is attached to the trailing end of the slider.

The external-cavity VCSEL 300 is connected to slider 210 so that the linear path 350 of its output laser beam is aligned generally orthogonal to trailing end 215 and the plane of grating coupler 77. The external-cavity VCSEL 300 includes semiconductor substrate 310 having generally parallel first and second surfaces 310a, 310b. The semiconductor substrate 310 may be formed of GaAs or AlGaAs. The first surface 310a has deposited on it in succession first Bragg mirror 314, gain layer 316, dielectric layer 322 with aperture 322a, and second Bragg mirror 318. An annular isolation trench 323 separates second mirror 318 from the semiconductor substrate 310. A first electrode layer 324a provides electrical contact with second mirror 318 and a second electrode layer 324b provides electrical contact with semiconductor substrate 310. The electrodes 324a, 324b allow electrical current to flow through the aperture 322a. The second surface 310b of semiconductor substrate 310 has a block of material 330 attached. The material 330 may be glass or another material transparent to the laser radiation, such as plastic, and may be attached to surface 310b by a conventional adhesive, such as epoxy glue. The third mirror 328 for the external-cavity VCSEL 300 is formed on the output side of material 330 opposite to the side attached to semiconductor substrate surface 310b. As shown in FIG. 3, the semiconductor substrate 310 has a thickness $T_S$ and the block of material 330 has a length $L_0$. In the embodiment of FIG. 3, the semiconductor substrate 310 and the block of attached material 330 together function as the external cavity with a length $L_1=T_S+L_0$. However, the semiconductor substrate 310 may have a thickness of $L_0$ so that the semiconductor substrate 310 alone functions as the external cavity, in the manner as shown in FIG. 1. The semiconductor substrate 310 alone or together with material 330 may have a total length $L_1$ in the range of about 300 to 1500 μm.

The carrier 400 has a generally U-shape with a base 401 and legs 402, 404 that are generally parallel to the laser beam's linear path 350. The carrier base 401 is connected at the first surface 310a of the semiconductor substrate 310, with the opposite surface 310b facing the slider trailing end 215. The carrier legs 402, 404 are connected to the slider trailing end 215. The carrier 400 may be formed of various materials, including silicon, aluminum nitride ceramic, or beryllium oxide, and fabricated by known microfabrication processes or by conventional machining The carrier base 401 has electrically conductive contact pads 405a, 405b that connect with electrodes 324a, 324b, respectively, of the external-cavity VCSEL 300. The external-cavity VCSEL 300 may be attached to the carrier base 401 by reflowed solder connections at the contact pads 405a, 405b and electrodes 324a, 324b. The carrier legs 402, 404 have ends 402a, 404a, respectively, that are attached to respective contact pads 207, 209 on the trailing end 215 of slider 210. The attachment may be by reflowed solder joints 406, 408, respectively, to pads 207, 209 on the slider trailing end 215. The attachment of the external-cavity VCSEL 300 to carrier base 401 and the connection of carrier legs 402, 404 to the slider 210 by solder reflow joints provides heat sinking from the external-cavity VCSEL 300 through the contact pads 405a, 405b to the carrier base 401 and legs 402, 404 back to the slider 210. The carrier base 401 and legs 402, 404 have electrically conductive traces 411a, 411b that provide electrical connection from the contact pads 405a, 405b, respectively, back to electrical contact pads 207, 209, respectively, on the slider trailing end 215. The top surface 250 of the slider 210 is attached to a flexure/suspension assembly (not shown) which has electrical leads that connect to the contact pads 207, 209 and provide electrical connection back to the disk drive electronics so that current can be directed to the external-cavity VCSEL 300.

Figure 4:
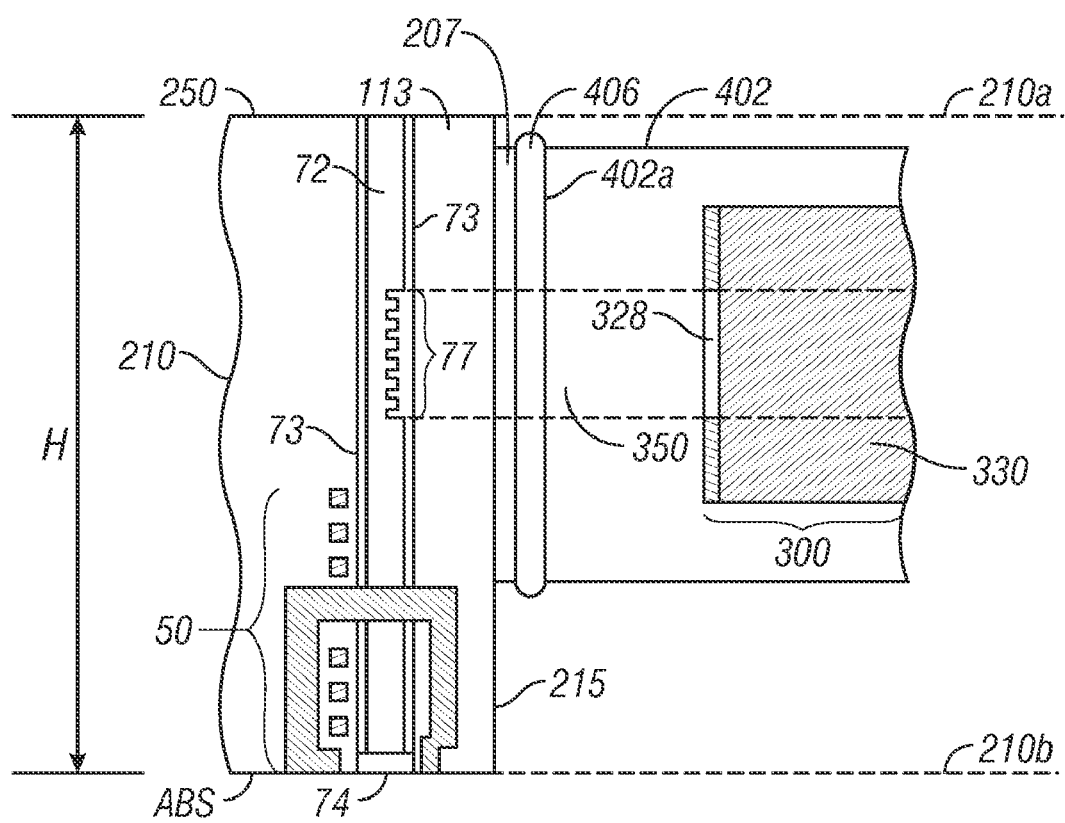
FIG. 4 is a sectional view along a plane through the length of the external-cavity VCSEL showing the attachment of a carrier leg and the alignment of the laser beam with the slider trailing end according to the invention.

FIG. 4 is a sectional view along a plane through the length of external-cavity VCSEL 300 showing the attachment of a carrier leg and the alignment of the laser beam with the slider trailing end 215. Carrier leg 402 is shown with its end 402a attached to contact pad 207 on slider trailing end 215 by a reflowed solder joint 406. Dashed lines 210a, 210b represent extensions of the slider planes corresponding to the slider top surface 250 and bottom surface (ABS), respectively. The carrier (with only leg 402 shown in FIG. 4) and the attached external-cavity VCSEL 300 are located within the region bounded by the two planes 210a, 210b. Thus the carrier 400 and attached external-cavity VCSEL 300 do not increase the overall height H of the slider, so there is no need to increase the disk-to-disk spacing of the disk drive.

Figure 5:
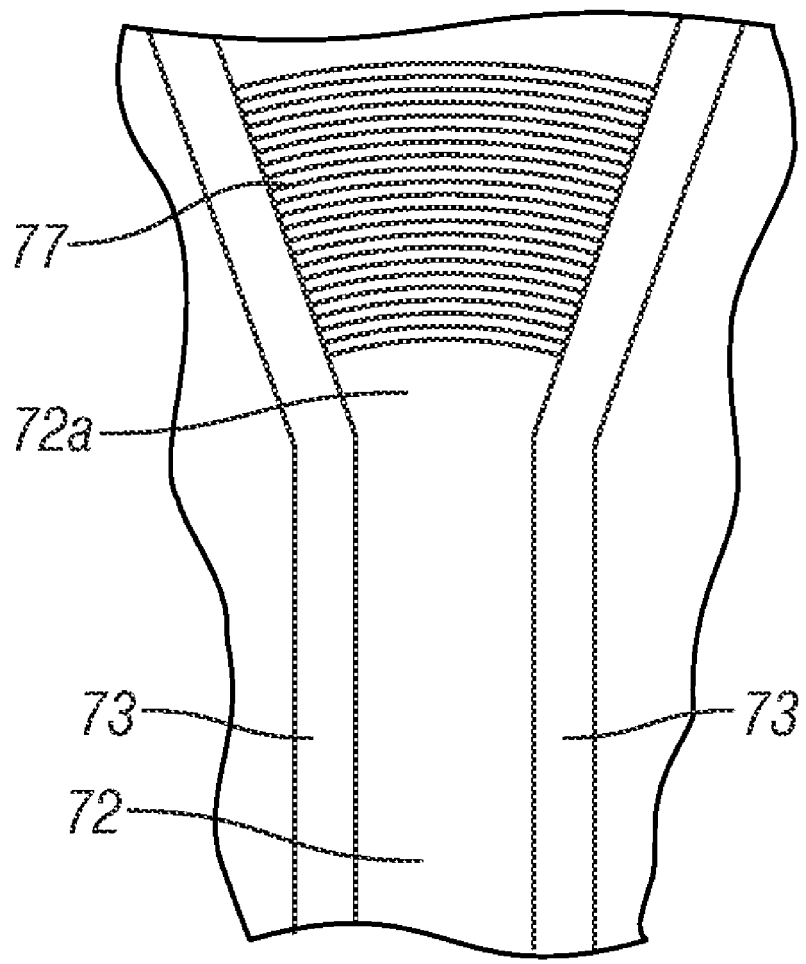
FIG. 5 is a view of the grating coupler and waveguide portion according to the invention as viewed from a direction orthogonal to the slider trailing end.

The laser beam output from output mirror 328 has a generally linear path that is substantially orthogonal to slider trailing end 215. The laser beam travels through insulating layer 113 to grating coupler 77 that lies in a plane generally parallel to trailing end 215. The insulating material 113, typically alumina, is transparent to the laser radiation, which may have a wavelength between about 920 and 1000 nm. The grating coupler 77 turns the incoming laser radiation 90 degrees and directs it into waveguide 72, which is located between cladding layers 73. The waveguide 72 directs the laser radiation to NFT 74 at the ABS. FIG. 5 is a view of grating coupler 77 and shows the tapered input end 72a of waveguide 72 as viewed from a direction orthogonal to trailing end 215. The grating coupler 77 is coupled to the tapered end 72a of waveguide 72, which is located between cladding layers 73. Grating couplers are well-known and have been proposed for use in TAR heads, as described for example in US 20090310459 A1. Focusing grating couplers and grating couplers coupled to tapered waveguides are described by Van Laere, et al., "Compact Focusing Grating Couplers for Silicon-on-Insulator Integrated Circuits", *IEEE PHOTONICS TECHNOLOGY LETTERS*, VOL. 19, NO. 23, Dec. 1, 2007, pp. 1919-1921.

Figure 6:
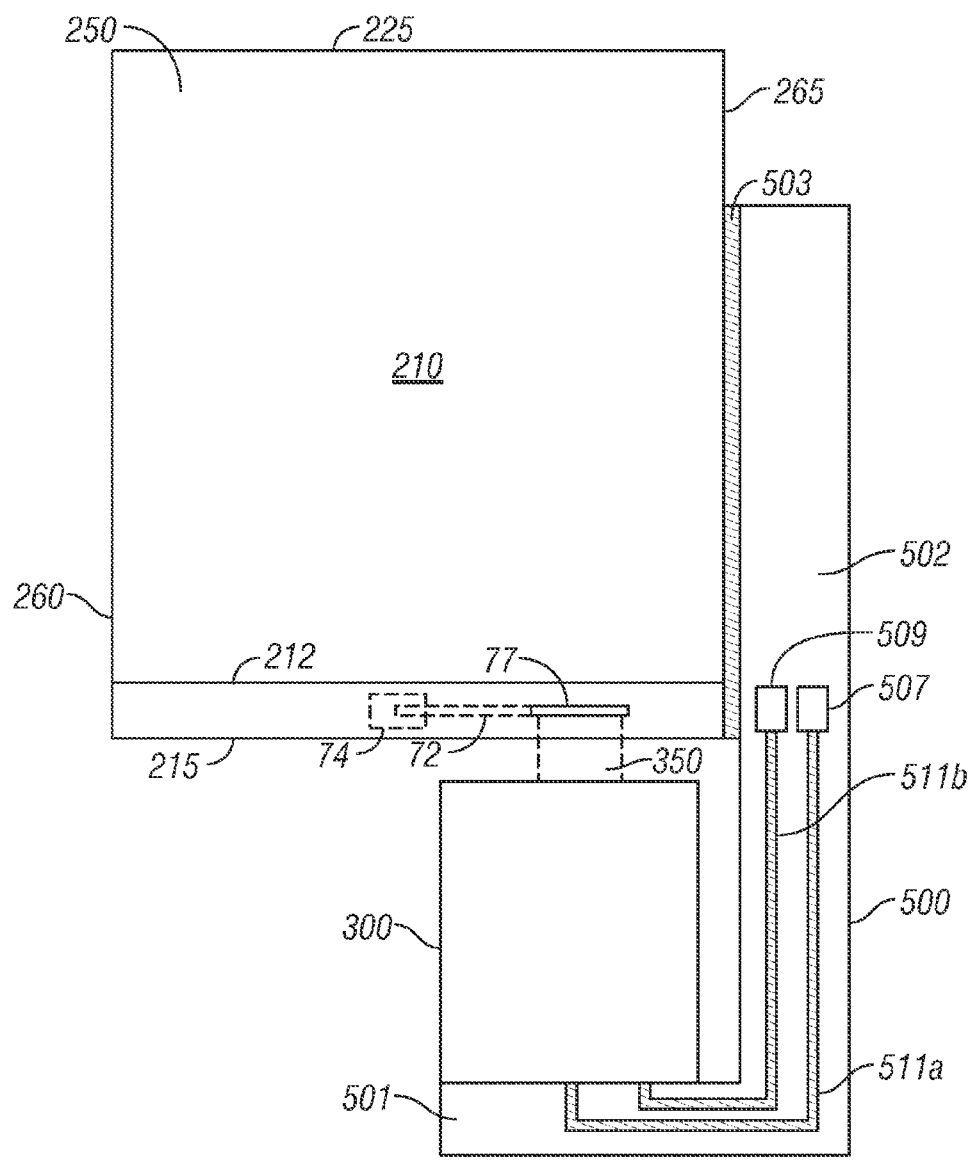
FIG. 6 is a top view of a slider with integrated TAR head and integrated external-cavity VCSEL according to another embodiment of the invention wherein the carrier is attached to a side of the slider.

FIG. 6 is a top view of a slider with integrated TAR head and integrated external-cavity VCSEL according to another embodiment of the invention wherein the carrier is attached to a side of the slider. The carrier 500 has a generally L-shape that includes a base 501 and a side leg 502. Side leg 502 may be attached to side 265 of slider 210 by a layer of adhesive 503, such as epoxy. The relatively large surface area for the attachment of leg 502 to slider edge 265 provides good heat sinking for heat generated by the external-cavity VCSEL 300. The external-cavity VCSEL 300 and its attachment to carrier base 501 is like that described with respect to FIG. 3. The carrier base 501 and leg 502 have electrically conductive traces 511a, 511b that provide electrical connection from the external-cavity VCSEL 300 back to electrical contact pads 507, 509. The pads 507, 509 may be connected to electrical leads from the flexure/suspension assembly (not shown) that is attached to the top surface 250 of slider 210. The external-cavity VCSEL 300 has its linear path 350 aligned orthogonal to the slider trailing end 215 but offset from the midline between slider edges 260, 265. The grating coupler 77 is similarly offset, but the waveguide 72 (shown in dotted lines) to which it is coupled is angled downward toward the midline to NFT 74, which is located at the midline at the slider ABS. Like the embodiment of FIG. 3, in the embodiment of FIG. 6 heat sinking from the VCSEL 300 is through contact pads that connect it to the carrier base 501. The relatively large contact area of leg 501 with side 265 of slider 210 allows for rapid heat dissipation to the slider 210.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) head structure for a magnetic recording disk drive comprising:
    a slider having a disk-facing surface, a top surface opposite to said disk-facing surface, a front end, a trailing end and two sides, the slider having a height defined by the distance between the disk-facing surface and the top surface and a length defined by the distance between the front and trailing ends;
    a laser diode comprising a semiconductor substrate having first and second substantially parallel surfaces defining a length greater than 300 µm, the laser light being output from said second surface, and contact pads on said first surface; and
    a carrier connecting the laser diode to the slider and having a base connected to the contact pads on said first surface of the semiconductor substrate and at least one leg connected to the slider, the carrier and connected laser diode being located within a region bounded by upper and lower surfaces parallel with the slider top and disk-facing surfaces, respectively, the laser diode being connected to the slider with the laser's linear laser beam path aligned substantially orthogonal to said second surface of the semiconductor substrate and the trailing end of the slider.

2. The head structure of claim 1 wherein the carrier has a base and two legs spaced on opposite sides of the laser diode, the legs extending generally parallel to the laser's linear laser beam path and each leg having an end attached to the trailing end of the slider.

3. The head structure of claim 2 further comprising at least two solder joints connecting the ends of the carrier legs to the trailing end of the slider.

4. The head structure of claim 1 wherein the carrier has a base and one leg, the leg extending substantially parallel to the laser's linear laser beam path and being attached to a side of the slider.

5. The head structure of claim 4 further comprising an adhesive connecting the carrier leg to the side of the slider.

6. The head structure of claim 1 further comprising an optical waveguide on the slider oriented substantially parallel to the trailing end of the slider, the waveguide having a grating coupler, and wherein the laser's linear beam path is aligned with the grating coupler.

7. The head structure of claim 6 further comprising a near-field transducer (NFT) coupled to the waveguide and located at the disk-facing surface.

8. The head structure of claim 1 wherein the laser diode is an external-cavity vertical cavity surface emitting laser (VCSEL) comprising a VCSEL on said first surface of the semiconductor substrate and having first and second mirrors, a gain layer between the mirrors and a dielectric layer having an aperture therein; and an output third mirror on the second surface of the semiconductor substrate.

9. The head structure of claim 8 wherein the semiconductor substrate is the external cavity for the external-cavity VCSEL.

10. The head structure of claim 8 further comprising an external cavity between the second surface of the semiconductor substrate and the output third mirror.

11. The head structure of claim 9 wherein the external cavity comprises a layer of material transparent to the radiation from the external-cavity VCSEL.

12. The head structure of claim 1 further comprising electrical contact pads on the slider trailing end and electrical conductors on the carrier interconnecting the contact pads of the laser diode with the contact pads on the slider.

13. The head structure of claim 1 further comprising a write head on the slider and having a write pole at the disk-facing surface, and a magnetoresistive read head on the slider.

14. A thermally-assisted perpendicular magnetic recording disk drive comprising:
    a perpendicular magnetic recording disk comprising a disk substrate and a perpendicular magnetic recording layer on the disk substrate; and
    the head structure of claim 1; wherein the slider is maintained near the disk with the spacing between the disk-facing surface and the recording layer being less than the wavelength of the laser radiation from the laser diode.

15. The disk drive of claim 13 wherein the perpendicular magnetic recording layer is patterned into discrete data islands.

16. A thermally-assisted recording (TAR) head structure for a magnetic recording disk drive comprising:

a slider having an air-bearing surface (ABS) for facing the disk, a top surface opposite the ABS, a front end, a trailing end and two sides, the slider having a height defined by the distance between the ABS and the top surface;

an optical waveguide at the slider trailing end and having a grating coupler oriented in a plane substantially parallel to the slider trailing end;

a near-field transducer (NFT) at the ABS and coupled to the waveguide;

an external-cavity vertical cavity surface emitting laser (VCSEL) comprising a semiconductor substrate having first and second substantially parallel surfaces; a VCSEL on a first surface of the semiconductor substrate and having first and second mirrors, a gain layer between the mirrors and a dielectric layer having an aperture therein; an output third mirror opposite the semiconductor first surface; and an external cavity between the VCSEL and the output mirror; a first electrode connected to the second mirror; and a second electrode connected to the semiconductor substrate; the external-cavity VCSEL having a linear path corresponding to the laser beam from the VCSEL through the semiconductor substrate and the output third mirror; and a carrier connecting the external-cavity VCSEL to the slider, the carrier and connected external-cavity VCSEL being located within a region bounded by upper and lower surfaces parallel with the slider ABS and top surface, respectively, the external-cavity VCSEL being connected to the slider with the linear path of the laser beam aligned substantially orthogonal to the plane of the grating coupler.

17. The head structure of claim 16 wherein the semiconductor substrate is the external cavity for the external-cavity VCSEL and the output mirror is attached to the second surface of the semiconductor substrate.

18. The head structure of claim 16 further comprising material transparent to the laser radiation from the VCSEL and located between the second surface of the semiconductor substrate and the output mirror, wherein the external cavity comprises the semiconductor substrate and said transparent material.

19. The head structure of claim 16 wherein the carrier has a base and two legs spaced on opposite sides of the external-cavity VCSEL, the legs extending substantially parallel to the laser's linear laser beam path and each leg having an end attached to the trailing end of the slider, and wherein the grating coupler is located substantially at the midpoint between the two sides of the slider.

20. The head structure of claim 16 wherein the carrier is attached to a side of the slider, and wherein the grating coupler is located between a side of the slider and the midpoint between the two sides of the slider.

* * * * *